US011919385B2

United States Patent
(12) United States Patent
Izuhara

(10) Patent No.: US 11,919,385 B2
(45) Date of Patent: Mar. 5, 2024

(54) FUEL INLET STRUCTURE OF VEHICLE

(71) Applicant: TOYOTA JIDOSHA KABUSHIKI KAISHA, Toyota (JP)

(72) Inventor: Tsuyoshi Izuhara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/897,631

(22) Filed: Aug. 29, 2022

(65) Prior Publication Data

US 2023/0070591 A1 Mar. 9, 2023

(30) Foreign Application Priority Data

Sep. 7, 2021 (JP) ................................ 2021-145615

(51) Int. Cl.
*B60K 15/05* (2006.01)
*B60K 15/03* (2006.01)

(52) U.S. Cl.
CPC .... *B60K 15/05* (2013.01); *B60K 2015/03447* (2013.01); *B60K 2015/053* (2013.01); *B60K 2015/0553* (2013.01)

(58) Field of Classification Search
CPC .......... B60K 15/05; B60K 2015/03447; B60K 2015/053; B60K 2015/0553
USPC ......................................................... 280/830
See application file for complete search history.

(56) References Cited

U.S. PATENT DOCUMENTS

2010/0313969 A1* 12/2010 Stokes .................. B60K 15/04 137/312
2013/0206757 A1* 8/2013 Nagai .................... B60K 15/04 220/86.2
2020/0269682 A1 8/2020 Domon

FOREIGN PATENT DOCUMENTS

JP 2007084043 A * 4/2007 ......... B29C 45/4407
JP 2020-138618 A 9/2020
WO WO-2020149418 A1 * 7/2020

* cited by examiner

*Primary Examiner* — Mahmoud Gimie
(74) *Attorney, Agent, or Firm* — Dinsmore & Shohl LLP

(57) ABSTRACT

A fuel inlet structure of a vehicle, including a vehicle body panel, an inlet box, and a seal portion. The seal portion includes: an inner seal portion provided in correspondence with the whole circumference of the flange portion; an outer seal portion provided in correspondence with the whole circumference of the flange portion; and a water catching portion, the water catching portion, in a portion of the whole circumference of the seal portion that is a lower portion in the vehicle vertical direction, projecting from a region between a proximal end portion of the inner seal portion and a proximal end portion of the outer seal portion to a region encompassing an area between the drain portion and the inner seal portion, the water-catching portion being configured to stop water that passes through the drain portion from a vehicle outer side.

5 Claims, 6 Drawing Sheets

UP
FR
10
10R
12
14
16

FUEL INLET STRUCTURE OF VEHICLE

CROSS-REFERENCE TO RELATED APPLICATION

This application is based on and claims priority under 35 USC 119 from Japanese Patent Application No. 2021-145615 filed on Sep. 7, 2021, the disclosure of which is incorporated by reference herein.

BACKGROUND

Technical Field

The present disclosure relates to a fuel inlet structure of a vehicle.

Related Art

A structure is known (for example, see FIG. 5 in Japanese Patent Application Laid-Open (JP-A) No. 2020-138618) in which a seal portion is provided in a vicinity of a box aperture of an inlet box. The seal portion forms a seal between a flange portion of the inlet box and a vehicle body panel. The seal portion is a double seal structure in which an inner seal portion and an outer seal portion are both in contact with the vehicle body panel. With this structure, for example, during car washing, direct impact of high-pressure water against the inner seal portion may be prevented by the outer seal portion.

Although not explicitly stated in JP-A No. 2020-138618, a drain portion is usually formed in a portion of an outer seal portion, for draining water that ingresses to between the outer seal portion and an inner seal portion.

However, with this structure, if high-pressure water enters directly through the drain portion, for example, during car washing, the high-pressure water may deform the inner seal portion and ingress into a vehicle cabin.

SUMMARY

In consideration of the circumstances described above, an object of the present disclosure is to provide a fuel inlet structure of a vehicle that may prevent or suppress ingression of water into a cabin even when a drain portion is formed in a portion of an outer seal portion.

A fuel inlet structure of a vehicle according to a first aspect of the present disclosure includes: a vehicle body panel, a mounting aperture for inlet box mounting penetrating through the vehicle body panel; an inlet box attached to the vehicle body panel, the inlet box including: a box portion, the box portion being formed in a box shape and disposed such that a box opening thereof is oriented toward a cabin outer side, a penetrating hole being formed in a floor wall portion of the box portion, and a flange portion, the flange portion extending from a whole circumference of a peripheral edge of the box opening and being disposed along a peripheral edge portion of the mounting aperture of the vehicle body panel; and a seal portion, the seal portion being provided at a distal end side of the flange portion and disposed at the cabin outer side of the vehicle body panel, the seal portion forming a seal between the flange portion and the vehicle body panel along the whole circumference of the flange portion. The seal portion includes: an inner seal portion provided in correspondence with the whole circumference of the flange portion, the inner seal portion being in contact with a region at a peripheral edge side of the mounting aperture of the vehicle body panel along the whole circumference of the flange portion; an outer seal portion provided in correspondence with the whole circumference of the flange portion, the outer seal portion being in contact with the vehicle body panel in a region further from the peripheral edge of the mounting aperture than the inner seal portion, and a drain portion for drainage being formed penetrating through a portion of a region of the outer seal portion that is disposed at a vehicle lower side relative to the inner seal portion; and a water catching portion, the water catching portion, in a portion of the whole circumference of the seal portion that is a lower portion in the vehicle vertical direction, projecting from a region between a proximal end portion of the inner seal portion and a proximal end portion of the outer seal portion to a region encompassing an area between the drain portion and the inner seal portion, the water-catching portion being configured to stop water that passes through the drain portion from a vehicle outer side.

According to the structure described above, the seal portion disposed at the vehicle outer side of the vehicle body panel is provided at the distal end side of the flange portion of the inlet box. This seal portion forms a seal between the flange portion of the inlet box and the vehicle body panel along the whole circumference. The inner seal portion of the seal portion is provided in correspondence with the whole circumference of the flange portion of the inlet box, and is in contact with the region at the peripheral edge side of the mounting aperture of the vehicle body panel along the whole circumference. The outer seal portion of the seal portion is provided in correspondence with the whole circumference of the flange portion of the inlet box, and is in contact with the vehicle body panel in the region that is further from the peripheral edge of the mounting aperture than the inner seal portion is. Therefore, direct impact against the inner seal portion by high-pressure water, for example, during car washing may be prevented by the outer seal portion. Thus, a risk of water ingressing into the cabin from between the inner seal portion and the outer seal portion may be reduced.

The drain portion for drainage is formed penetrating through a portion of the region of the outer seal portion that is disposed at the vehicle lower side relative to the inner seal portion. Therefore, water that enters to between the outer seal portion and the inner seal portion may drain through the drain portion. In the portion of the whole circumference of the seal portion that is a lower portion in the vehicle vertical direction, the water-catching portion of the seal portion projects from the region between the proximal end portion of the inner seal portion and the proximal end portion of the outer seal portion to the region encompassing the area between the drain portion and the inner seal portion. The water-catching portion stops water that has passed through the drain portion from the vehicle outer side. Therefore, direct impact against the inner seal portion by high-pressure water that passes through the drain portion, for example, during car washing may be prevented by the water-catching portion. Thus, the risk of water ingressing into the cabin between the inner seal portion and the vehicle body panel may be further reduced.

In a fuel inlet structure of a vehicle according to a second aspect of the present disclosure, the structure of the first aspect further includes a seal connecting portion, the seal connecting portion connecting the proximal end portion of the inner seal portion with the proximal end portion of the outer seal portion, wherein the water-catching portion projects integrally from the seal connecting portion.

According to the structure described above, formation of a gap between the proximal end side of the water-catching portion and the seal connecting portion may be prevented. Thus, ingression of water as a result of this kind of gap may be prevented.

In a fuel inlet structure of a vehicle according to a third aspect of the present disclosure, in the structure of the first aspect or the second aspect, from a proximal end side of the water-catching portion toward the vehicle lower side, the water-catching portion is angled to a cabin inner side thereof, a distal end side of the water-catching portion is curved to an opposite side from a side thereof at which the inner seal portion is disposed, and the distal end side of the water-catching portion presses against the vehicle body panel.

According to the structure described above, surface pressure of a region at which the water-catching portion is in contact with the vehicle body panel may be raised, while abutting of the water-catching portion against the inner seal portion is avoided. Therefore, functioning of the inner seal portion may be maintained even while ingression of water between contact portions of the water-catching portion and the vehicle body panel is suppressed effectively.

In a fuel inlet structure of a vehicle according to a fourth aspect of the present disclosure, the structure of any one of the first to third aspects further includes plural engaging portions, the plural engaging portions being provided at an outer periphery side of a periphery wall portion of the box portion, the engaging portions engaging at the mounting aperture of the vehicle body panel, and engagement of the plural engaging portions at the mounting aperture of the vehicle body panel attaching the inlet box to the vehicle body panel.

According to the structure described above, there is no need to form fastening holes penetrating through the flange portion of the inlet box and portions of the vehicle body panel surrounding the mounting aperture. Therefore, there is no need to specify that positions of the inner seal portion in an elevation view of the inlet box are at the opposite side of the fastening holes from positions of the outer seal portion, sandwiching the fastening holes. Thus, a separation distance between the outer seal portion and the inner seal portion may be reduced along the whole circumference. If the separation distance between the outer seal portion and the inner seal portion is reduced along the whole circumference, then when high-pressure water passes through the drain portion and ingresses to between the outer seal portion and the inner seal portion during, for example, car washing, an amount of water that is initially retained is reduced, which is disadvantageous for suppressing ingression of water to the cabin inner side. However, because the water-catching portion is provided in the present disclosure, high-pressure water passing through the drain portion and directly impacting against the inner seal portion during car washing may be prevented by the water-catching portion. Thus, ingression of water to the cabin inner side may be suppressed.

As described above, according to the fuel inlet structure of a vehicle of the present disclosure, an effect is provided in that ingression of water into a cabin may be prevented or suppressed even when a drain portion is formed in a portion of an outer seal portion.

BRIEF DESCRIPTION OF THE DRAWINGS

Exemplary embodiments of the present disclosure will be described in detail based on the following figures, wherein.

DETAILED DESCRIPTION

A fuel inlet structure of a vehicle according to an exemplary embodiment of the present disclosure is described using FIG. 1 to FIG. 6. An arrow FR that is shown as appropriate in these drawings indicates a vehicle front side, an arrow UP indicates a vehicle upper side, and an arrow OUT indicates a vehicle width direction outer side.

Structure of the Exemplary Embodiment

Figure 1:
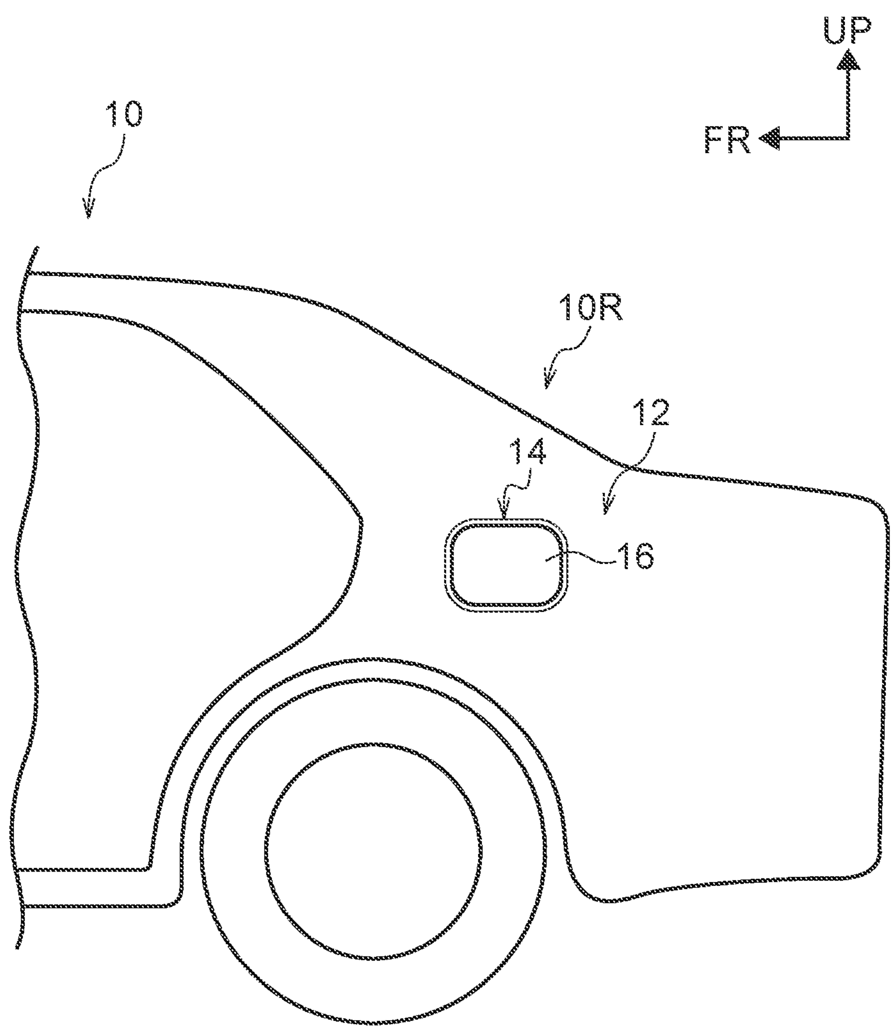
FIG. 1 is a simplified side view showing a rear portion of a car at which a fuel inlet structure of a vehicle according to an exemplary embodiment of the present disclosure is employed.

FIG. 1 shows a simplified side view of a rear portion 10R of a car 10, which serves as a vehicle in which the fuel inlet structure for a vehicle according to the present exemplary embodiment is employed. As shown in FIG. 1, the car 10 includes a side outer panel 12 that serves as a vehicle body panel. The side outer panel 12 structures an outer side portion of the vehicle body. A fuel inlet portion 14 is provided at a portion of the side outer panel 12. A lid 16 is provided, to be capable of opening and closing, at the vehicle width direction outer side of the fuel inlet portion 14.

Figure 2:
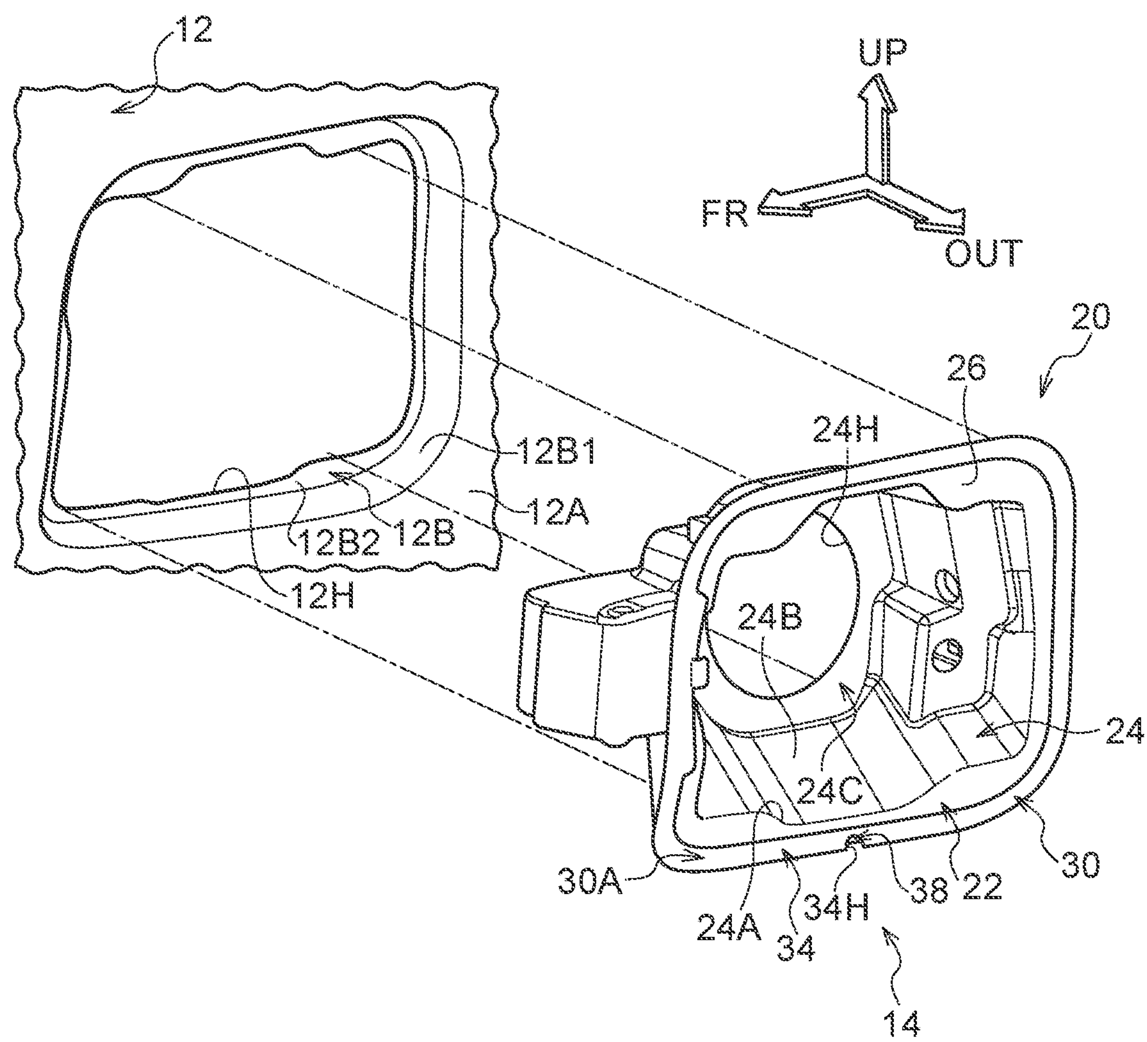
FIG. 2 is an exploded perspective view showing a state in which an inlet box with seal is disassembled from a side outer panel of FIG. 1.

FIG. 2 shows an exploded perspective view of a state in which an inlet box with seal 20 is disassembled from the side outer panel 12 at the fuel inlet portion 14. As shown in FIG. 2, the side outer panel 12 at the fuel inlet portion 14 is provided with a recess portion 12B that is recessed by a step from a general surface 12A of the fuel inlet portion 14, which faces to the vehicle width direction outer side. The recess portion 12B includes a step portion 12B1 and a floor wall portion 12B2. A mounting aperture 12H for inlet box mounting is formed penetrating through the floor wall portion 12B2.

Figure 3:
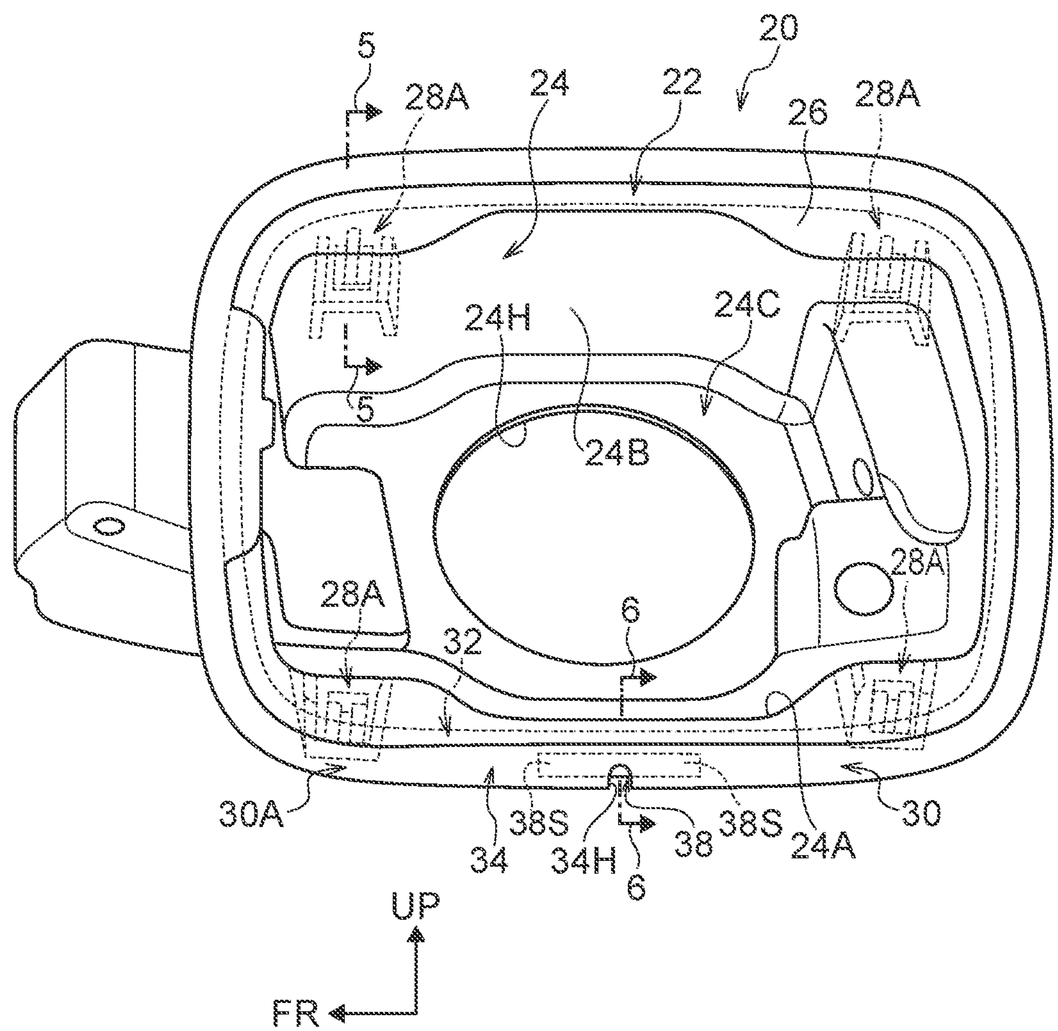
FIG. 3 is a perspective view showing the inlet box with seal of FIG. 2 in a view seen from a different direction from FIG. 2.

FIG. 3 shows the inlet box with seal 20 in a perspective view seen from a different direction from FIG. 2. As illustrated in FIG. 2 and FIG. 3, the inlet box with seal 20 includes an inlet box 22, which is fabricated of resin, and a seal portion 30, which is fabricated of rubber.

The inlet box 22 is provided with a box portion 24 that is formed in a box shape and is disposed such that a box opening 24A is oriented to a cabin outer side. The box portion 24 includes a periphery wall portion 24B, which contains the box opening 24A, and a floor wall portion 24C, which is formed continuously from end portions at the cabin inner side of the periphery wall portion 24B. A penetrating hole 24H is formed in the floor wall portion 24C. A filler pipe, which is not shown in the drawings, is disposed at the penetrating hole 24H. The filler pipe is connected to a fuel tank, which is not shown in the drawings. The inlet box 22 is further provided with a flange portion 26, which extends from the whole circumference of a peripheral edge of the box opening 24A. The flange portion 26 is arranged along a peripheral edge portion of the mounting aperture 12H of the side outer panel 12 shown in FIG. 2.

Figure 4:
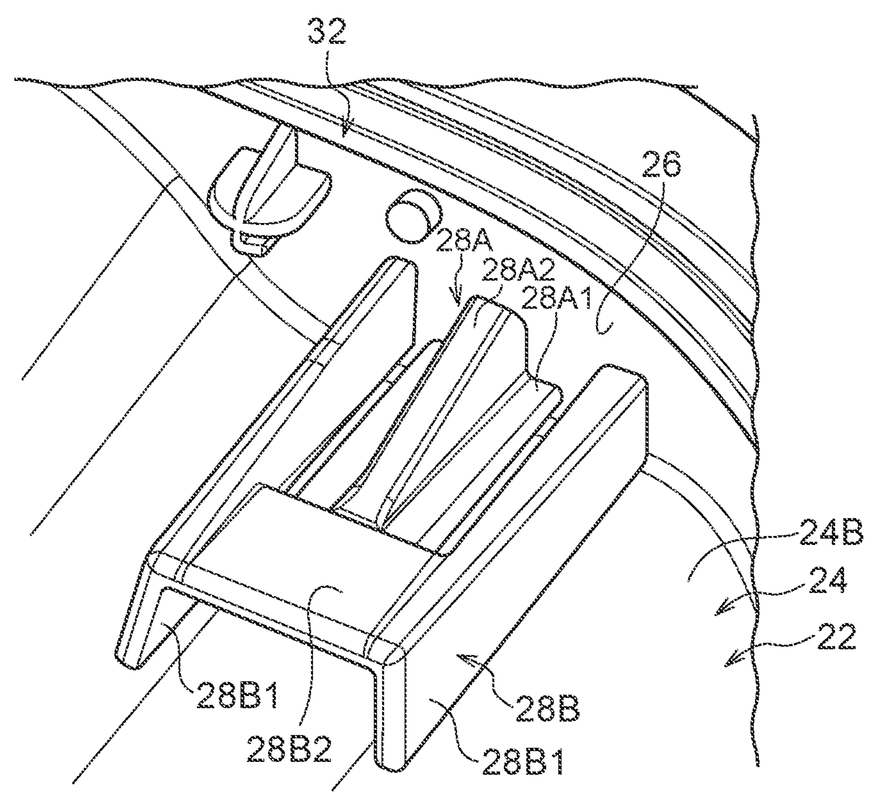
FIG. 4 is a perspective view showing an engaging portion provided at the inlet box of FIG. 3, magnified in a view seen from a different direction from FIG. 3.
Figure 4:
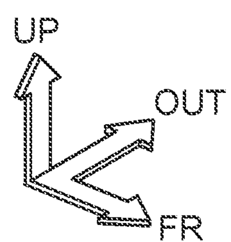
Figure 5:
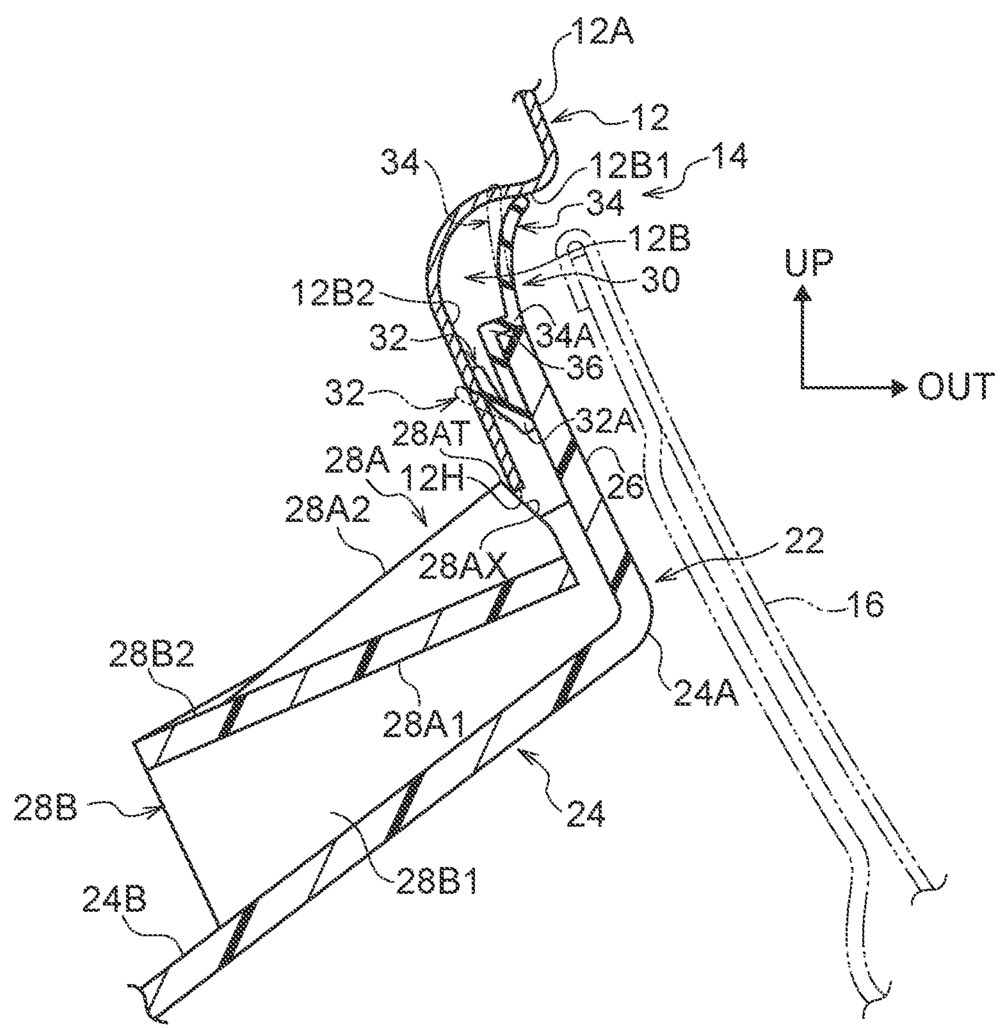
FIG. 5 is a magnified sectional diagram showing the engaging portion and surrounding portions thereof in a state in which the inlet box is attached to the side outer panel, in a section cut at a section position corresponding to line 5-5 in FIG. 3.

As shown in FIG. 3, a plural number (for example, four) of engaging portions 28A are provided at the outer periphery side of the periphery wall portion 24B of the box portion 24. Each engaging portion 28A is a component that may be understood as an engaging pawl. FIG. 4 is a perspective view in which one of the engaging portions 28A provided at the inlet box 22 is magnified and seen in a view from a different direction from FIG. 3. FIG. 5 is a magnified sectional diagram showing the engaging portion 28A and surrounding portions thereof in a state in which the inlet box 22 is attached to the side outer panel 12, in a section cut at a section position corresponding to line 5-5 in FIG. 3.

As shown in FIG. 4 and FIG. 5, the engaging portion 28A is cantilevered from a base portion 28B that is formed integrally at an outer face side of the periphery wall portion 24B. As shown in FIG. 4, the base portion 28B is provided with a pair of side wall portions 28B1 and a connecting wall portion 28B2. The side wall portions 28B1 protrude from the outer face of the periphery wall portion 24B. The connecting wall portion 28B2 connects portions of protrusion direction distal end portions of the pair of side wall portions 28B1 with one another. The pair of side wall portions 28B1 extend in a direction orthogonal to an inner face of the flange portion 26, and are formed to be, for example, integrally continuous with the flange portion 26. The connecting wall portion 28B2 is specified to be at a position separated from the flange portion 26.

The engaging portion 28A extends in the direction orthogonal to the inner face of the flange portion 26 and is formed to be integrally continuous with the connecting wall portion 28B2. The engaging portion 28A is provided with a base plate portion 28A1 and a protrusion portion 28A2. The base plate portion 28A1 is disposed so as to oppose the outer face of the periphery wall portion 24B. The protrusion portion 28A2 protrudes to the opposite side of the base plate portion 28A1 from the side thereof at which the periphery wall portion 24B is disposed. The protrusion portion 28A2 is provided at a width direction central portion of the base plate portion 28A1 (a central portion in a short side direction intersecting the direction of extension of the base plate portion 28A1). A protrusion amount of the protrusion portion 28A2 steadily increases toward the side of the protrusion portion 28A2 at which the flange portion 26 is disposed. As shown in FIG. 5, an inner face 28AX of a region at the protrusion distal end side of the protrusion portion 28A2 faces to the side thereof at which the flange portion 26 is disposed. In the direction in which the protrusion portion 28A2 protrudes from the base plate portion 28A1, the inner face 28AX is angled a little to the opposite side from the side thereof at which the flange portion 26 is disposed.

The engaging portion 28A is resiliently deformable, and a free end side thereof is displaceable up and down. The box portion 24 of the inlet box 22 is inserted into the mounting aperture 12H of the side outer panel 12 from the vehicle outer side and, while a protrusion distal end 28AT of each protrusion portion 28A2 is displaced up or down, the box portion 24 is inserted to the vehicle inner side beyond the mounting aperture 12H of the side outer panel 12. Hence, the engaging portions 28A are engaged at the mounting aperture 12H of the side outer panel 12. In the present exemplary embodiment, the inlet box 22 is attached to the side outer panel 12 by the plural engaging portions 28A engaging at the mounting aperture 12H of the side outer panel 12.

The seal portion 30 to be disposed at the vehicle outer side of the side outer panel 12 is provided at the distal end side of the flange portion 26 of the inlet box 22. The seal portion 30 is molded integrally with the inlet box 22 (by two-shot molding), and forms a seal between the flange portion 26 of the inlet box 22 and the side outer panel 12 along the whole circumference. As illustrated in FIG. 3 and FIG. 5, the seal portion 30 is a double seal structure provided with an inner seal portion 32 and an outer seal portion 34. The inner seal portion 32 and the outer seal portion 34 are both provided in correspondence with the whole circumference of the flange portion 26.

The inner seal portion 32 is in contact with a region at the peripheral edge side of the mounting aperture 12H of the side outer panel 12 along the whole circumference. As shown in FIG. 5, from a proximal end portion 32A of the inner seal portion 32 toward the side of the recess portion 12B of the side outer panel 12 at which the floor wall portion 12B2 is formed, the inner seal portion 32 is angled to the opposite side from the side thereof at which the mounting aperture 12H is formed. At the distal end side of the inner seal portion 32, the inner seal portion 32 is curved to the opposite side from the side at which the mounting aperture 12H is formed, and the inner seal portion 32 presses against the floor wall portion 12B2 of the recess portion 12B of the side outer panel 12.

The outer seal portion 34 is in contact with the side outer panel 12 in a region further from the peripheral edge of the mounting aperture 12H than the inner seal portion 32 is. From a proximal end portion 34A of the outer seal portion 34 toward the side at which the step portion 12B1 of the side outer panel 12 is formed, the outer seal portion 34 is angled slightly to the opposite side from the side thereof at which the floor wall portion 12B2 is formed. At the distal end side of the outer seal portion 34, the outer seal portion 34 is curved to the opposite side from the side at which the floor wall portion 12B2 is formed, and the outer seal portion 34 presses against the step portion 12B1 of the side outer panel 12.

As shown in FIG. 3, a drain portion 34H for drainage is formed penetrating through a portion of a region of the outer seal portion 34 that is disposed at the vehicle lower side relative to the inner seal portion 32. A formation position of the drain portion 34H in the vehicle front-and-rear direction is in, for example, a region encompassing a vehicle front-and-rear direction central position of the outer seal portion 34. The drain portion 34H is open to the vehicle lower side and is formed as a substantially semicircular notch portion in an elevation view.

Figure 6:
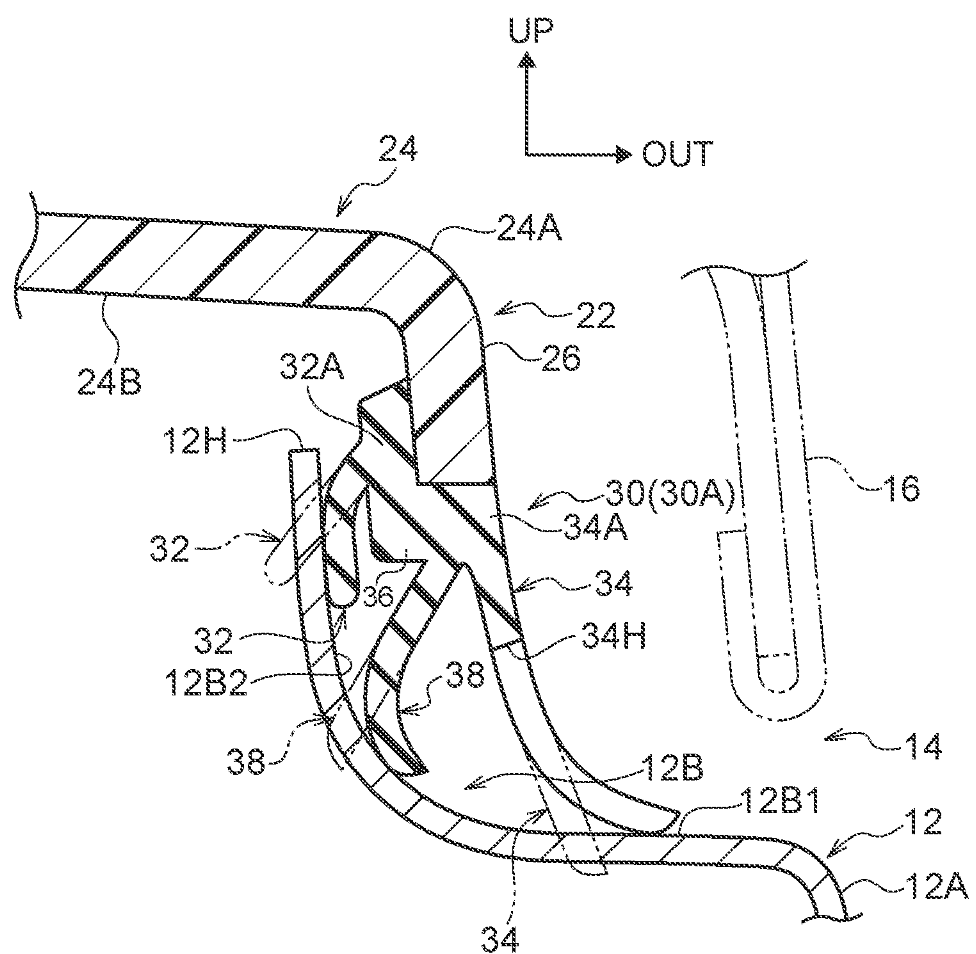
FIG. 6 is a magnified sectional diagram showing a drain portion and surrounding portions thereof in the state in which the inlet box is attached to the side outer panel, in a section cut at a section position corresponding to line 6-6 in FIG. 3.

FIG. 6 is a magnified sectional diagram showing the drain portion 34H and surrounding portions thereof in the state in which the inlet box 22 is attached to the side outer panel 12, in a section cut at a section position corresponding to line 6-6 in FIG. 3. As shown in FIG. 5 and FIG. 6, the seal portion 30 is provided with a seal connecting portion 36 that integrally connects the proximal end portion 32A of the inner seal portion 32 with the proximal end portion 34A of the outer seal portion 34.

As shown in FIG. 3, a water-catching portion 38 is provided in a portion of the whole circumference of the seal portion 30 that is a lower portion 30A in the vehicle vertical direction. As shown in FIG. 6, the water-catching portion 38 projects from the seal connecting portion 36, which is a region between the proximal end portion 32A of the inner seal portion 32 and the proximal end portion 34A of the outer seal portion 34, to a region encompassing an area between the drain portion 34H and the inner seal portion 32. As seen from an elevation view side of the inlet box 22 shown in FIG. 3, the water-catching portion 38 is disposed in a range encompassing a range in a left-and-right direction that corresponds to the drain portion 34H. Thus, the water-catching portion 38 is capable of stopping water that passes through the drain portion 34H from the vehicle outer side. When the inlet box 22 is viewed from the elevation view side, the range in which the water-catching portion 38 is disposed in the left-and-right direction is, more specifically, a range constituted by a range corresponding to the drain portion 34H and predetermined ranges continuing from both sides thereof (the ranges of two side regions 38S depicted by dotted lines in FIG. 3, which are ranges with widths several times a width of the drain portion 34H).

As shown in FIG. 6, the water-catching portion 38 is formed as a plate-shaped portion that integrally projects from the seal connecting portion 36. From a proximal end side of the water-catching portion 38 toward the vehicle lower side, the water-catching portion 38 is angled to the cabin inner side thereof. At the distal end side thereof, the water-catching portion 38 is curved to the opposite side from the side thereof at which the inner seal portion 32 is disposed, and presses against the side outer panel 12. That is, the water-catching portion 38 according to the present exemplary embodiment may be understood as a component that serves as a middle seal portion forming a seal with a different region from the inner seal portion 32 and the outer seal portion 34.

The inner seal portion 32, outer seal portion 34 and water-catching portion 38 shown in FIG. 5 and FIG. 6 are pressed against the side outer panel 12 by the engagement illustrated in FIG. 5 of the engaging portions 28A at the mounting aperture 12H of the side outer panel 12. In FIG. 5 and FIG. 6, shapes of the inner seal portion 32, outer seal portion 34 and water-catching portion 38 if the same were not pressing against the side outer panel 12 are illustrated by two-dot chain lines.

Operation and Effects of the Exemplary Embodiment

Now, operation and effects of the above exemplary embodiment are described.

As shown in FIG. 5 and FIG. 6, the seal portion 30 that is disposed at the vehicle outer side of the side outer panel 12 is provided at the distal end side of the flange portion 26 of the inlet box 22. The seal portion 30 forms seals between the flange portion 26 of the inlet box 22 and the side outer panel 12 along the whole circumference. The inner seal portion 32 of the seal portion 30 is provided in correspondence with the whole circumference of the flange portion 26 of the inlet box 22, and is in contact with the region at the peripheral edge side of the mounting aperture 12H of the side outer panel 12 along the whole circumference. The outer seal portion 34 of the seal portion 30 is provided in correspondence with the whole circumference of the flange portion 26 of the inlet box 22, and is in contact with the side outer panel 12 in the region that is further from the peripheral edge of the mounting aperture 12H than the inner seal portion 32. Therefore, direct impact against the inner seal portion 32 by high-pressure water, for example, during car washing may be prevented by the outer seal portion 34. Thus, a risk of water ingressing into the cabin between the inner seal portion 32 and the side outer panel 12 may be reduced.

As shown in FIG. 3 and FIG. 6, the drain portion 34H for drainage is formed penetrating through the portion of the region of the outer seal portion 34 that is disposed at the vehicle lower side relative to the inner seal portion 32. Therefore, water that enters to between the outer seal portion 34 and the inner seal portion 32 may drain through the drain portion 34H.

The water-catching portion 38 is provided at the seal portion 30 in the portion of the whole circumference of the seal portion 30 that is the lower portion 30A in the vehicle vertical direction. As shown in FIG. 6, the water-catching portion 38 projects from the region between the proximal end portion 32A of the inner seal portion 32 and the proximal end portion 34A of the outer seal portion 34 to the region encompassing the area between the drain portion 34H and the inner seal portion 32. The water-catching portion 38 stops water that passes through the drain portion 34H from the vehicle outer side. Therefore, direct impact against the inner seal portion 32 by high-pressure water passing through the drain portion 34H during car washing may be prevented by the water-catching portion 38, and the risk of water ingressing into the cabin between the inner seal portion 32 and the side outer panel 12 may be further reduced. Thus, watertightness is assured.

In the present exemplary embodiment, as shown in FIG. 3, the range in which the water-catching portion 38 is disposed in the left-and-right direction when seen from the elevation view side of the inlet box 22 is constituted by the range corresponding to the drain portion 34H and the predetermined ranges continuing from both sides of that range (which are ranges with widths several times the width of the drain portion 34H). Therefore, watertightness is at a very high level. Conversely, because the water-catching portion 38 is specified in a limited range of the lower portion 30A of the seal portion 30 in the length direction, excellent drainage through the drain portion 34H may be achieved.

In the present exemplary embodiment, as shown in FIG. 6, the proximal end portion 32A of the inner seal portion 32 and the proximal end portion 34A of the outer seal portion 34 are integrally connected by the seal connecting portion 36, and the water-catching portion 38 projects integrally from the seal connecting portion 36. Therefore, formation of a gap between the proximal end side of the water-catching portion 38 and the seal connecting portion 36 may be prevented. Thus, ingression of water as a result of this kind of gap may be prevented.

In the present exemplary embodiment, from the proximal end side of the water-catching portion 38 toward the vehicle lower side, the water-catching portion 38 is angled to the cabin inner side thereof. At the distal end side thereof, the water-catching portion 38 is curved to the opposite side from the side thereof at which the inner seal portion 32 is formed, and the distal end side presses against the side outer panel 12. Therefore, surface pressure of a region at which the water-catching portion 38 is in contact with the side outer panel 12 may be raised, while abutting of the water-catching portion 38 against the inner seal portion 32 is avoided. Therefore, functioning of the inner seal portion 32 may be maintained even while ingression of water between contact portions of the water-catching portion 38 and the side outer panel 12 is suppressed effectively.

In the present exemplary embodiment, as shown in FIG. 3 and FIG. 5, the plural engaging portions 28A that engage at the mounting aperture 12H of the side outer panel 12 are provided at the outer periphery side of the periphery wall portion 24B of the box portion 24 of the inlet box 22. The inlet box 22 is attached to the side outer panel 12 by the plural engaging portions 28A engaging at the mounting aperture 12H of the side outer panel 12. With this structure, there is no need to form fastening holes penetrating through the flange portion 26 of the inlet box 22 and portions of the side outer panel 12 surrounding the mounting aperture 12H. Therefore, there is no need to take account of fastening holes when specifying positions of the inner seal portion 32, and a separation distance between the outer seal portion 34 and the inner seal portion 32 may be reduced along the whole circumference.

If the separation distance between the outer seal portion 34 and the inner seal portion 32 is reduced along the whole circumference, then when high-pressure water passes through the drain portion 34H shown in FIG. 3 and FIG. 6 and ingresses to between the outer seal portion 34 and the inner seal portion 32 during, for example, car washing, an amount of water that is initially retained is reduced. This is disadvantageous for suppressing ingression of water to the cabin inner side. However, because the water-catching portion 38 is provided in the present exemplary embodiment, high-pressure water passing through the drain portion 34H and directly impacting against the inner seal portion 32 during car washing may be prevented by the water-catching portion 38. Thus, ingression of water to the cabin inner side may be suppressed.

According to the fuel inlet structure of a vehicle of according to the present exemplary embodiment as described above, ingression of water into the cabin may be prevented or suppressed even though the drain portion 34H is formed in a portion of the outer seal portion 34.

Supplementary Descriptions of the Exemplary Embodiment

In the exemplary embodiment described above, the seal portion 30 is formed integrally with the inlet box 22. However, as a variant example of the exemplary embodiment described above, a seal portion may be formed as a separate body from an inlet box (22) and tightly fitted to the distal end side of a flange portion (26) of the inlet box (22).

In the exemplary embodiment described above, the water-catching portion 38 projects integrally from the seal connecting portion 36. However, as a variant example of the exemplary embodiment described above, for example, a water-catching portion may be formed as a separate body from one or both of an inner seal portion (32) and an outer seal portion (34), and may be engaged with the one or both of the same.

As a variant example of the exemplary embodiment described above, a structure may be employed in which a distal end portion of a water-catching portion abuts against a vehicle body panel (the side outer panel 12) without being curved. As an alternative variant example, a structure may be employed in which a distal end portion of a water-catching portion is slightly apart from a vehicle body panel (the side outer panel 12).

As another variant example of the exemplary embodiment described above, a structure may be employed in which a flange portion of an inlet box is attached to a vehicle body panel (the side outer panel 12) by fastenings.

The exemplary embodiment described above and numerous variant examples mentioned above may be embodied in suitable combinations.

Above, examples of the present disclosure have been described. The present disclosure is not limited by these descriptions and it will be clear that numerous modifications outside of these descriptions may be embodied within a technical scope not deviating from the gist of the disclosure.

What is claimed is:

1. A fuel inlet structure of a vehicle, the fuel inlet structure comprising:

- a vehicle body panel, a mounting aperture for inlet box mounting penetrating through the vehicle body panel;
- an inlet box attached to the vehicle body panel, the inlet box including:
  - a box portion, the box portion being formed in a box shape and disposed such that a box opening thereof is oriented toward a cabin outer side, a penetrating hole being formed in a floor wall portion of the box portion, and
  - a flange portion, the flange portion extending from a whole circumference of a peripheral edge of the box opening and being disposed along a peripheral edge portion of the mounting aperture of the vehicle body panel; and
- a seal portion, the seal portion being provided at a distal end side of the flange portion and disposed at the cabin outer side of the vehicle body panel, the seal portion forming a seal between the flange portion and the vehicle body panel along the whole circumference of the flange portion, wherein the seal portion includes:

- an inner seal portion provided in correspondence with the whole circumference of the flange portion, the inner seal portion being in contact with a region at a peripheral edge side of the mounting aperture of the vehicle body panel along the whole circumference of the flange portion;
- an outer seal portion provided in correspondence with the whole circumference of the flange portion, the outer seal portion being in contact with the vehicle body panel in a region further from the peripheral edge of the mounting aperture than the inner seal portion, and a drain portion for drainage being formed penetrating through a portion of a region of the outer seal portion that is disposed at a vehicle lower side relative to the inner seal portion; and
- a water catching portion, the water catching portion, in a portion of the whole circumference of the seal portion that is a lower portion in a vehicle vertical direction, projecting from a region between a proximal end portion of the inner seal portion and a proximal end portion of the outer seal portion to a region encompassing an area between the drain portion and the inner seal portion, the water catching portion being configured to stop water that passes through the drain portion from a vehicle outer side, wherein:
- from a proximal end side of the water catching portion toward the vehicle lower side, the water catching portion is angled to a cabin inner side thereof,
- a distal end side of the water catching portion is curved to an opposite side from a side thereof at which the inner seal portion is disposed, and
- the distal end side of the water catching portion presses against the vehicle body panel.

2. The fuel inlet structure of a vehicle according to claim 1, further comprising a seal connecting portion, the seal connecting portion connecting the proximal end portion of the inner seal portion with the proximal end portion of the outer seal portion, wherein the water catching portion projects integrally from the seal connecting portion.

3. The fuel inlet structure of a vehicle according to claim 1, further comprising a plurality of engaging portions, the plurality of engaging portions being provided at an outer periphery side of a periphery wall portion of the box portion, the plurality of engaging portions engaging at the mounting aperture of the vehicle body panel, and engagement of the plurality of engaging portions at the mounting aperture of the vehicle body panel attaching the inlet box to the vehicle body panel.

4. A fuel inlet structure of a vehicle, the fuel inlet structure comprising:

a vehicle body panel, a mounting aperture for inlet box mounting penetrating through the vehicle body panel;

an inlet box attached to the vehicle body panel, the inlet box including:

a box portion, the box portion being formed in a box shape and disposed such that a box opening thereof is oriented toward a cabin outer side, a penetrating hole being formed in a floor wall portion of the box portion, and a flange portion, the flange portion extending from a whole circumference of a peripheral edge of the box opening and being disposed along a peripheral edge portion of the mounting aperture of the vehicle body panel; and a seal portion, the seal portion being provided at a distal end side of the flange portion and disposed at the cabin outer side of the vehicle body panel, the seal portion forming a seal between the flange portion and the vehicle body panel along the whole circumference of the flange portion; and a plurality of engaging portions, the plurality of engaging portions being provided at an outer periphery side of a periphery wall portion of the box portion, the plurality of engaging portions engaging at the mounting aperture of the vehicle body panel, and engagement of the plurality of engaging portions at the mounting aperture of the vehicle body panel attaching the inlet box to the vehicle body panel, wherein the seal portion includes:

an inner seal portion provided in correspondence with the whole circumference of the flange portion, the inner seal portion being in contact with a region at a peripheral edge side of the mounting aperture of the vehicle body panel along the whole circumference of the flange portion;

an outer seal portion provided in correspondence with the whole circumference of the flange portion, the outer seal portion being in contact with the vehicle body panel in a region further from the peripheral edge of the mounting aperture than the inner seal portion, and a drain portion for drainage being formed penetrating through a portion of a region of the outer seal portion that is disposed at a vehicle lower side relative to the inner seal portion; and a water catching portion, the water catching portion, in a portion of the whole circumference of the seal portion that is a lower portion in a vehicle vertical direction, projecting from a region between a proximal end portion of the inner seal portion and a proximal end portion of the outer seal portion to a region encompassing an area between the drain portion and the inner seal portion, the water catching portion being configured to stop water that passes through the drain portion from a vehicle outer side.

5. The fuel inlet structure of a vehicle according to claim 4, further comprising a seal connecting portion, the seal connecting portion connecting the proximal end portion of the inner seal portion with the proximal end portion of the outer seal portion, wherein the water catching portion projects integrally from the seal connecting portion.

* * * * *